United States Patent [19]

Brooks

[11] Patent Number: 4,545,124
[45] Date of Patent: Oct. 8, 1985

[54] SKEWED T-FILLET WELD GAUGE

[75] Inventor: Paul S. Brooks, Martinez, Calif.

[73] Assignee: Bechtel International Corporation, San Francisco, Calif.

[21] Appl. No.: 526,173

[22] Filed: Aug. 24, 1983

[51] Int. Cl.⁴ .............................................. G01B 5/02
[52] U.S. Cl. ................................................. 33/169 D
[58] Field of Search ............ 33/174 E, 169 D, 169 R, 33/403, 424

[56] References Cited

U.S. PATENT DOCUMENTS

| | | | |
|---|---|---|---|
| 402,763 | 5/1889 | Norcruss | 33/171 |
| 1,849,575 | 3/1932 | Huber | 33/424 |
| 2,316,189 | 4/1943 | Schaefer | 33/418 |

FOREIGN PATENT DOCUMENTS 82903 9/1956 Netherlands ..................... 33/169 D

*Primary Examiner*—Harry N. Haroian
*Attorney, Agent, or Firm*—Townsend and Townsend

[57] ABSTRACT

A weld gauge for measuring the dimensions of welds between a base member and a workpiece extending outwardly from the base member at an angle, such as an acute angle or an obtuse angle. The gauge includes aplate having an arm pivotally mounted thereon for movement past a scale on the plate, the arm frictionally engaging the plate so that it can be adjustably put into any one of number of fixed positions along the scale for measurement purposes. The plate of the gauge has an upper margin which extends at an acute angle relative to the horizontal so that the gauge can be placed in the limited space formed by the workpiece extending at an acute angle relative to the base member. The scale is on one face of the plate.

5 Claims, 2 Drawing Figures

U.S. Patent  Oct. 8, 1985  4,545,124
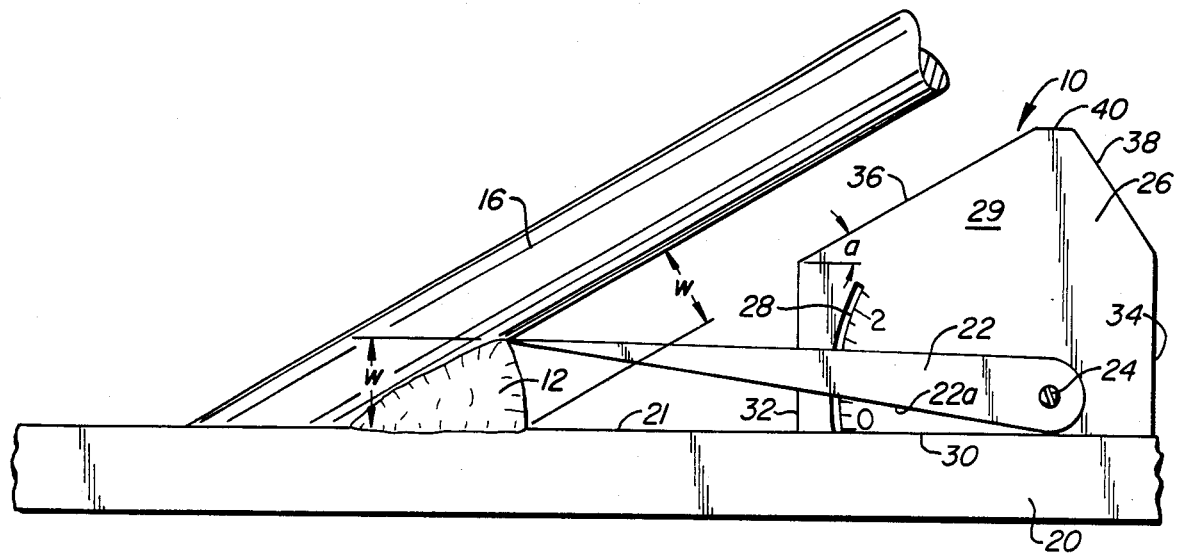
FIG._1.
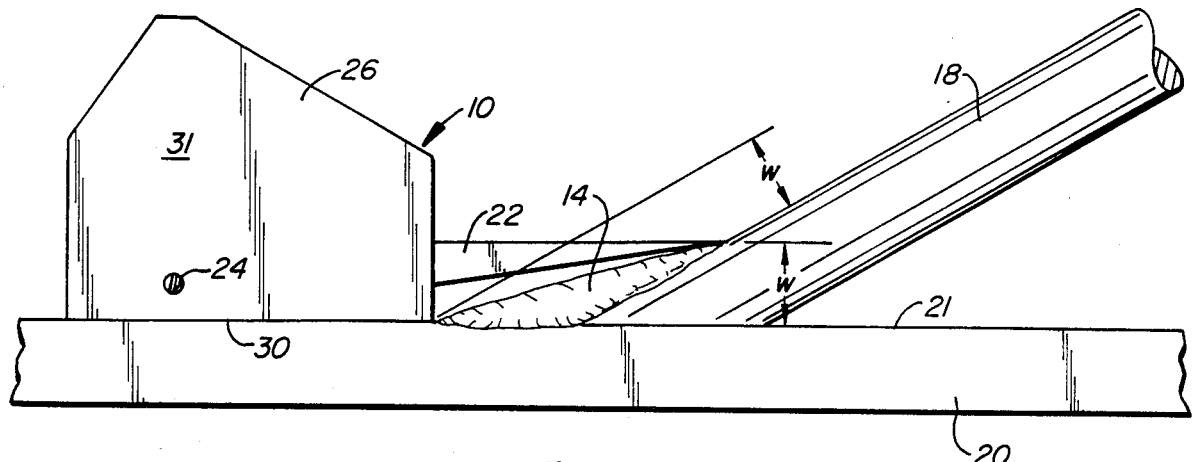
FIG._2.

SKEWED T-FILLET WELD GAUGE

The invention relates to improvements in the measurements of welds and, more particularly, to a weld gauge for measuring the w dimensions of skewed T-fillet welds.

BACKGROUND OF THE INVENTION

Gauges for measuring certain dimensions of welds have been known and used in the past. Generally, these gauges are suitable for use only for measuring T-fillet welds where are workpiece is welded to a base plate or other member and extends at right angles to the base plate. In such a case, it generally is a simple matter to move the weld gauge into proximity to the weld to be measured, then to manipulate the pivotal arm on the gauge to measure the height or other dimension of the weld with the main body of the gauge being spaced from but in proximity to the workpiece.

While conventional weld gauges are suitable for measuring T-fillet welds, they are not suitable for measuring skewed T-fillet welds and partial penetration groove welds because of the configurations of the gauges themselves. The configurations are such that the gauges cannot fit sufficiently close to a weld such that the arm on the gauge is long enough to measure the weld dimension itself. For this reason, conventional weld gauges are not suitable for measuring the dimensions of skewed T-fillet welds and partial penetration groove welds, a need exists for improved weld gauge for this purpose.

Prior publications relating to this general subject matter include U.S. Pat. No. 3,597,848, Dutch Pat. No. 82903 and German Pat. No. 626967.

SUMMARY OF THE INVENTION

The present invention satisfies the aforesaid need by providing a weld gauge capable of measuring the w dimensions of skewed T-fillet welds made in structural shapes, plates and tubes. At present, there is no single gauge that will perform this task.

The weld gauge of the present invention includes a plate on which a pointed arm is pivotally mounted. The plate has a scale on one of a pair of opposed faces thereon and the plate has an angular extending margin near the upper portion thereof which allows the plate and thereby the gauge to be placed in a spaced formed by the acute angle between a base plate or member and a workpiece extending outwardly and away from the base member at such acute angle. Moreover, the arm is long enough to permit measurement of the w dimension of a T-fillet weld in an obtuse angle between the base plate and a workpiece, the weld gauge being capable of measuring many types of skewed T-fillet welds and partial penetration groove welds. The weld gauge is simple and rugged in construction. It is preferably made of metal and can be produced at minimum cost.

The primary object of the present invention is to provide an improved gauge for measuring the w dimension of welds in skewed T-joints and partial penetration grooves wherein the weld gauge is configured to permit the measurement of such welds welds are in acute angles or obtuse angles to thereby provide a tool which is highly versatile yet is simple and rugged in construction and can be produced at minimum cost.

Other objects of this invention will become apparent as the following specification progresses, reference being had to the accompanying drawing for an illustration of the invention.

IN THE DRAWING

FIG. 1 is a side elevational view of the weld gauge of the present invention, showing the way in which the gauge measures the weld at one type of skewed "T" joint and FIG. 2 is a view similar to FIG. 1 but showing the way the gauge measures the weld at another type of skewed "T" joint.

The present invention comprises a gauge for measuring certain dimensions of welds at skewed "T" joints, the gauge being broadly denoted by the numeral 10. Typical welds capable of being measured with gauge 10 are welds 12 and 14 shown in FIGS. 1 and 2. Other welds include partial penetration groove welds. Weld 12 connects a workpiece 16 to a base plate or member 20 having an upper, generally flat reference surface 21. Weld 12 is in the acute angle between workpiece 16 and surface 21. Weld 14 connects a workpiece 18 to base plate 20. Weld 14 is in the obtuse angle between workpiece 18 and surface 21. For purposes of illustration workpieces 16 and 18 are cylindrical in configuration but can have other configurations, if desired.

Weld gauge 10 includes a pointed arm 22 pivotally mounted by a pin 24 on a rigid plate 26 for movement about the axis of pin 24 relative to the plate 26. A scale 28 is provided of one of the opposed faces 29 and 31, respectively, of plate 26, the scale being adjacent to arm 22 in the manner shown in FIG. 2. The scale 28 is calibrated in units of distance, such as centimeters or inches. The purpose of the scale is to provide a measurement of the dimension w of a weld.

Plate 26 has a pair of opposed side margins 32 and 34 which are generally parallel with each other and extend upwardly from a flat bottom margin 30. A pair of inclined margins 36 and 38 extend upwardly and converge to a top margin 40. The acute angle a formed between a horizontal line 37 and margin 38 (FIG. 1) is relatively shallow, such as 30° to 45°. This feature allows plate 26 to be positioned between reference surface 21 of base member 20 and workpiece 16, whereby gauge 10 can measure the w dimension of weld 12 in the acute angle formed between workpiece 16 and surface 21. Conventional weld gauges are not capable of performing this measurement because they are not configured to permit such measurement. Weld gauge 10 can also be used to measure weld 14 in the obtuse angle between surface 21 and workpiece 18 as shown in FIG. 2. In both cases, weld gauge 10 provides an accurate measurement of the w dimensions of the welds, yet the weld gauge is easy to handle and can measure substantially many types of skewed welds.

The bottom margin 30 of weld plate 26, which defines a first reference edge is substantially flat so as to be in surface-to-surface contact with upper surface 21 of base plate 20. Moreover, arm 22 frictionally engages the plate whereby the arm 22 is adjustably held at a fixed location to permit the user to make an accurate reading of the w dimension from scale 27, the reading being taken at the lower edge 22a of the arm, edge 22a defining a second reference edge. As shown in FIG. 1, first reference edge 30 and second reference edge 22a will be in side-by-side registry with each other when the arm 22 is in the zero or reference position, i.e., at the position where the scale reading is zero.

What is claimed is:

1. A gauge for measuring the height of a weld of a skewed T-joint when the weld is in an acute angle or an obtuse angle of the T-joint comprising:

a plate having a first reference edge and a length extending outwardly from said reference edge, said length being of a magnitude sufficient to allow the plate to be placed in the space defined by the acute angle of a skewed T-joint, said plate having a face provided with a scale thereon, said scale extending outwardly from said reference edge substantially longitudinally of said length; and an arm pivotally mounted on the plate and extending laterally and outwardly therefrom, said arm being adjacent to and movable along said scale to provide scale readings which indicate the height of a weld when the outer end of the arm is adjacent to the weld, said arm having a second reference edge movable into side-by-side registry with the first reference edge of the plate when the arm is moved into a reference or zero position on the scale, the reference edges defining an acute angle when the second reference edge is out of said registry with said first reference edge, the maximum width of said arm being a number of times less than the length of the arm, the arm having a length sufficient to allow the arm to measure the height of a weld in the obtuse angle of a skewed T-joint.

2. A weld gauge as set forth in claim 1, wherein the plate has a generally upright side margin, the portion of said arm extending laterally from said side margin being at least approximately one-half the length of the arm, said scale being adjacent to said side margin on one face of the plate.

3. A weld gauge as set forth in claim 1, wherein the arm frictionally engages the plate.

4. A weld gauge as set forth in claim 1, wherein the plate has an upper margin at an angle in the range of 30° to 45° relative to the horizontal.

5. A weld gauge as set forth in claim 1, wherein the arm has a pointed outer end.

* * * * *